United States Patent [19]
Winterstein

[11] Patent Number: 5,142,501
[45] Date of Patent: Aug. 25, 1992

[54] METHOD OF GEOPHYSICAL EXPLORATION BY ANALYZING SHEAR-WAVE POLARIZATION DIRECTIONS

[75] Inventor: Donald F. Winterstein, Brea, Calif.

[73] Assignee: Chevron Research and Technology Company, San Francisco, Calif.

[21] Appl. No.: 714,463

[22] Filed: Jun. 13, 1991

[51] Int. Cl.⁵ .......................... G01V 1/00; G01V 1/28
[52] U.S. Cl. ........................................ 367/75; 364/421
[58] Field of Search ............................. 367/75, 38, 59; 364/421

[56] References Cited

U.S. PATENT DOCUMENTS

| | | | |
|---|---|---|---|
| 4,803,666 | 2/1989 | Alford | 367/36 |
| 4,817,061 | 3/1989 | Alford et al. | 367/75 |
| 4,888,743 | 12/1989 | Thomsen | 367/75 |
| 4,903,244 | 2/1990 | Alford | 367/36 |
| 5,027,332 | 6/1991 | Alford | 367/75 |
| 5,029,146 | 7/1991 | Alford | 367/75 |

Primary Examiner—Ian J. Lobo
Attorney, Agent, or Firm—Edward J. Keeling; Matt W. Carson

[57] ABSTRACT

A method for geophysical exploration by analyzing shear-wave polarization directions relative to a fixed coordinate frame is disclosed, for either vertical seismic profile data or surface seismic reflection data. Energy in a selected time window of two off-diagonal components is determined, and the source and receiver coordinate frame is then rotated, and energy is again determined. A second rotation of the source and receiver coordinate frame is followed by a third energy determination. A simple trigonometric function equation is generated to fit the determined energy values, and a minimum energy value is determined. The coordinate frame is then rotated by the angle that gives the minimum energy value, so that all of the signal is put on the diagonal components.

4 Claims, 2 Drawing Sheets

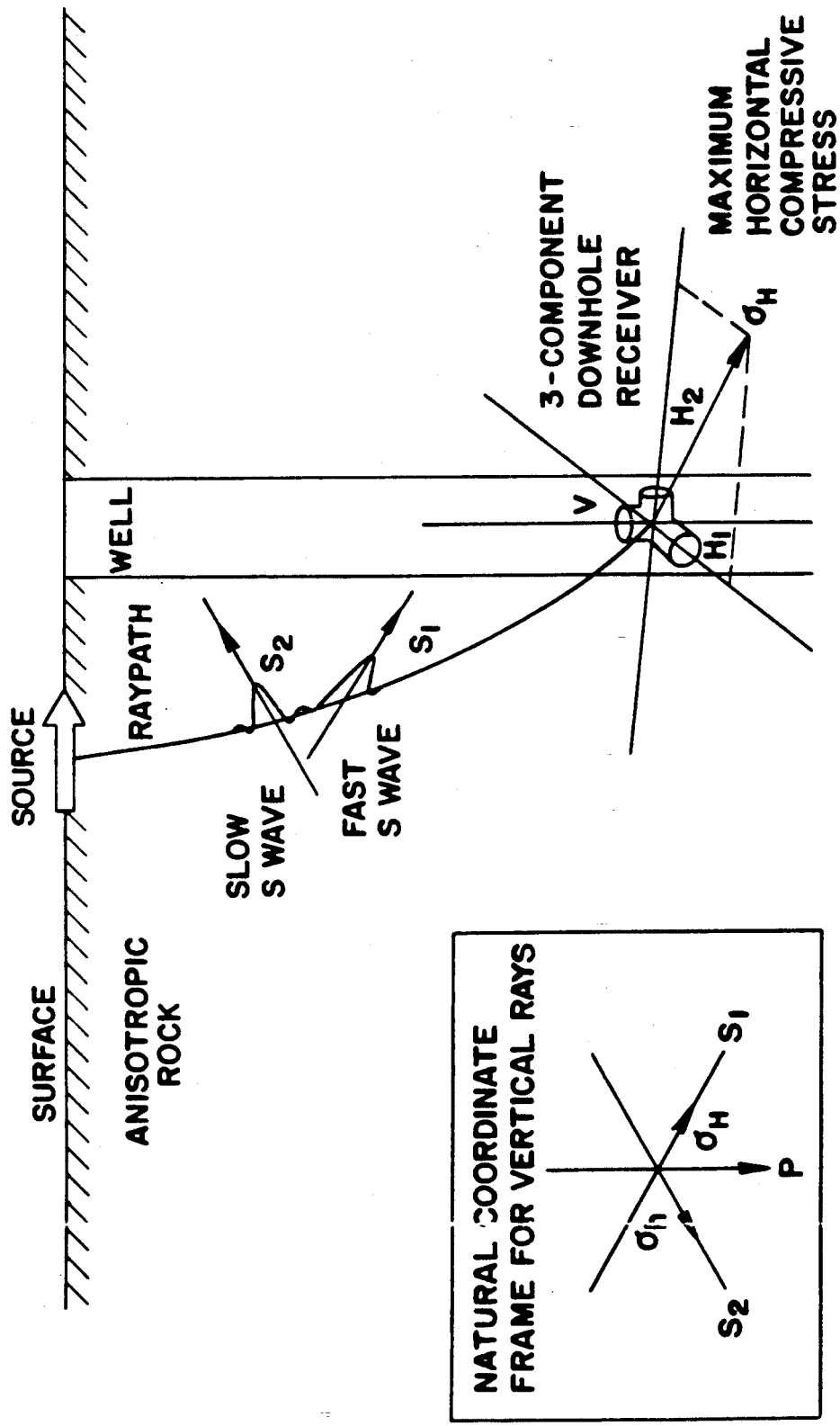
FIG_1
FIG_2

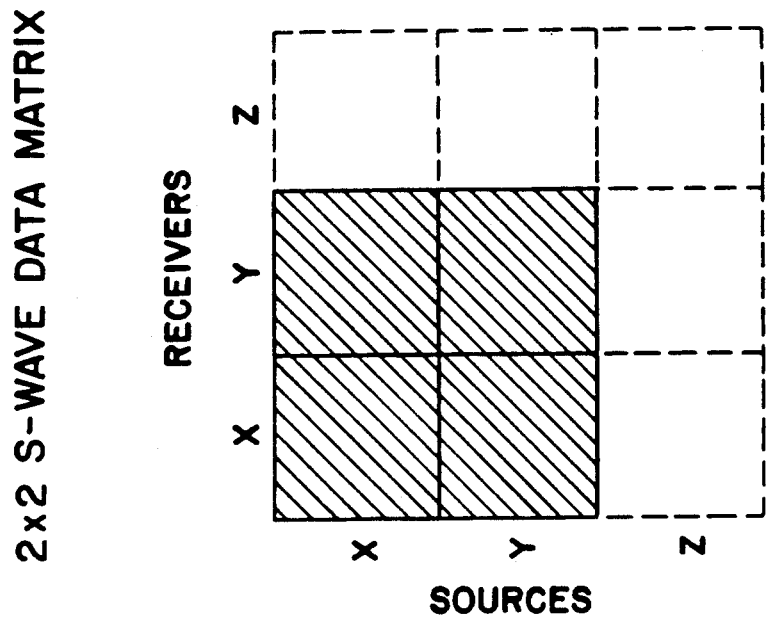
FIG_3b
2×2 S-WAVE DATA MATRIX
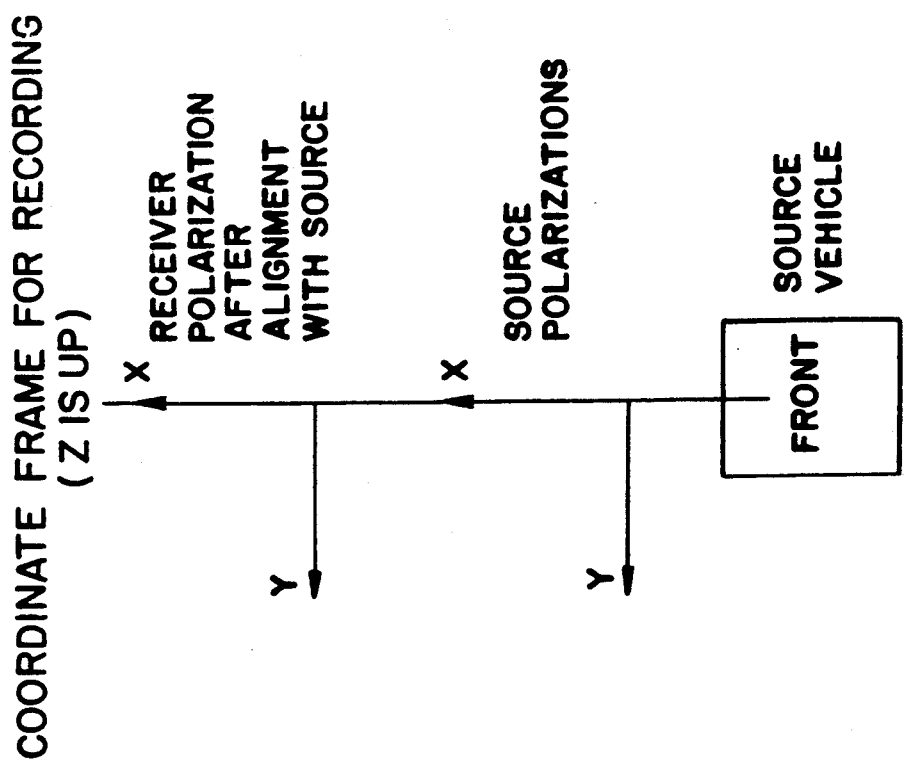
FIG_3a

METHOD OF GEOPHYSICAL EXPLORATION BY ANALYZING SHEAR-WAVE POLARIZATION DIRECTIONS

FIELD OF THE INVENTION

The present invention relates generally to geophysical exploration for oil and gas. More specifically, this invention provides a high-speed, automatic method for reliably and accurately analyzing shear-wave polarization directions relative to a fixed coordinate frame.

BACKGROUND OF THE INVENTION

Shear-wave (S-Wave) seismic exploration techniques have historically employed shear-wave seismic sources and shear-wave seismic receivers in a seismic survey to gather seismic data. Such a seismic survey has been either linear or areal in its extent. The seismic energy imparted by the shear-wave seismic source is detected by the shear-wave seismic receivers after interacting with the earth's subterranean formations. Such seismic surveys, however, until recently have been limited to utilizing a shear-wave seismic source having a single line of action or polarization, oriented with respect to the seismic survey line of profile, to preferentially generate seismic waves of known orientation, e.g., horizontal shear (SH) waves or vertical shear (SV) waves. The shear-wave seismic receivers utilized in conjunction with a given shear-wave seismic source have similarly been limited to a single line of action or polarization, oriented with respect to the seismic survey line of profile, to preferentially receive a single component of the seismic wave, e.g., SH wave or SV wave. As used herein, the term "line of action" generally comprehends a defined vector displacement, such as the particle motion of the seismic wave. In present shear-wave seismic surveys, the lines of action of the seismic source and the seismic receivers usually have the same orientation relative to the line of profile and if so are said to be "matched".

The term "polarization" in the context of seismic waves refers to the shape and spatial orientation of particle trajectories. Here we restrict the term to mean only the spatial orientation of the line along which a particle moves in a linearly polarized wave. Hence "polarization" and "polarization direction", as used here, both imply the spatial orientation of such a line, the latter term emphasizing the restriction to linear rather than more general (e.g., elliptical) motion. A "polarization change", then, does not mean a change, for example, from linear to elliptical motion nor a polarity reversal but only a change in the spatial orientation of the line along which a particle moves.

As long as seismic surveys were limited to seismic sources and seismic receivers having a compressional (P) wave lines of action, satisfactory results were generally obtained irrespective of the orientation of the seismic survey line of profile with respect to the underlying geological character of the subterranean formations. However, when the seismic sources and seismic receivers are of the shear-wave type, i.e., either horizontal shear (SH) wave or vertical shear (SV) wave, the orientation of the seismic survey line of profile and/or the line of action of the shear-wave seismic source with respect to the geological character of the subterranean formations can determine whether or not meaningful seismic data is obtained.

As understood by those skilled in the art, compressional (P) waves are longitudinal waves where the particle motion is in the direction of propagation. Shear-waves are transverse waves where the particle motion is in a transverse plane perpendicular to the direction of propagation. Two special classes of shear-waves are defined herein. Specifically, horizontal shear (SH) waves where the particle motion in the transverse plane is further restricted to be perpendicular to the line of profile of the seismic survey (i.e., horizontal) and vertical shear (SV) waves where the particle motion in the transverse plane is further restricted to be perpendicular to the horizontal shear (SH) particle motion.

As the orientation of the seismic survey line of profile is dependent on the geological character of the subterranean formation, when matched shear-wave seismic sources and shear-wave seismic receivers are used, it is known by those skilled in the art that shear-wave seismic surveys are adversely affected by azimuthally anisotropic subterranean formations. Azimuthally anisotropic subterranean formations are likely to have vertical planes of symmetry. Because shear-wave behavior is complicated and generally uninterpretable when the symmetry planes are neither parallel to nor perpendicular to the line of action of the shear-wave, care must be taken to ensure that the seismic survey line of profile is laid out either parallel or perpendicular to the symmetry planes.

When the seismic survey line of profile is laid out either parallel or perpendicular to the symmetry planes, the utilization of matched sets of (SH) wave and (SV) wave seismic receivers and seismic sources have provided useful information regarding the geological character of a subterranean formation. Such a technique requires prior knowledge of the seismic velocity anisotropy of the subterranean formation to be successful.

The interaction differences of SH waves and SV waves have been utilized to detect and measure the anisotropic properties of an azimuthally anisotropic subterranean formation when the seismic lines of profile are properly oriented with respect to the symmetry planes and matched sets of shear-wave seismic sources and shear-wave seismic receivers have been deployed in the seismic survey. In such applications, SH and SV-wave seismic sources and seismic receivers are utilized, but only in matched sets, i.e., SH-wave seismic sources with SH-wave seismic receivers and SV-wave seismic sources with SV-wave seismic receivers. However, if the seismic survey line of profile is not properly oriented with respect to the planes of symmetry, the seismic information observed can be difficult to interpret at best.

The orientation of the seismic survey line of profile with respect to the symmetry planes is critical. Consequently, utilization of matched sets of shear-wave seismic sources and shear-wave seismic receivers have produced inconsistent results when the seismic survey line of profile has not been properly laid out with respect to the anisotropic geological character of the subterranean formations.

Those acquainted with the art of seismic exploration, especially in seismically virgin territory, realized that prior knowledge of the geological character of the subterranean formations is generally not available prior to seismic exploration. The method and system of geophysical exploration of the present invention can be advantageously employed without regard to or knowledge of the geological character of the subterranean formations and still obtain meaningful seismic data.

U.S. Pat. No. 3,302,164 relates to seismic exploration for detecting fluids in formations by obtaining a ratio of the velocities of shear-waves and compressional waves along a seismic line of profile. In order for the ratio to be obtained, however, the frequency spectra of the waves introduced by a seismic source had to be controlled according to the average velocity ratio expected to be encountered. An article, "Combined Use of Reflected P and SH Waves in Geothermal Reservoir Exploration," Transactions of Geothermal Resources Council, Volume 1, May 1977, discussed tests made using both compressional and shear-waves in exploring for and evaluating geothermal reservoirs.

U.S Pat. No. 4,286,332 relates to a technique of propagating seismic shear-waves into the earth from compressional wave producing vibrators. U.S. Pat. No. 4,242,742 describes a technique of obtaining shear-wave seismic data from surveys where impact devices for waves are used as a seismic energy source.

S-wave birefringence, a property of elastic waves in anisotropic solids, is common for S-waves traveling vertically in crustal rocks. Early models of anisotropic sedimentary rocks proposed by exploration geophysicists were often transversely isotropic with vertical infinite-fold symmetry axes. Such solids are not birefringent for S-waves with vertical raypaths. Earthquake seismologists (e.g., Ando et al., 1983; Booth et al., 1985), however, found near-vertical S-wave birefringence in earthquake data in the early 1980s. At the same time, oil companies recording three-component (3-C) seismic data independently found vertical birefringence in hydrocarbon-bearing sedimentary basins. (Winterstein). Researchers from Amoco, Exxon, Chevron and Colorado School of Mines documented this vertical birefringence for the first time publicly in 1986 at annual meetings of the EAEG and SEG (e.g., Alford, 1986; Willis et al., 1986; Becker and Perelberg, 1986; Frasier and Winterstein, 1986; Martin et al., 1986). Since then much additional evidence for vertical birefringence in sedimentary basins has accumulated (e.g., Squires et al., 1989).

A common model for vertical S-wave birefringence is extensive dilatancy anisotropy (EDA) proposed by Crampin et al (1984). The essential feature of this model is that horizontal stresses such as those from plate tectonics create vertically oriented, fluid filled cracks or microcracks which cause anisotropy that, unlike transverse isotropy with a vertical axis, will cause vertical S-wave birefringence. The validity of EDA as an explanation for vertical birefringence is not established, but it and variants of it have proved useful as a framework within which to record and interpret experimental data. An alternate model, which we call the Nur model (Nur, 1971; Nur and Simmons, 1969), proposes the unstressed rock is isotropic with a uniform distribution of randomly oriented cracks. Axial stresses preferentially close the cracks perpendicular to stress directions, making the rock anisotropic. It is almost certain, whatever the best model proves to be, that much of the observed vertical S-wave birefringence results in some way from horizontal stresses. Crampin and Bush (1986) also pointed out that vertical S-wave birefringence might provide a useful tool for reservoir development. The polarization direction of the fast S-wave in simple cases gives the direction of maximum horizontal compressive stress, a quantity much in demand by those who induce fractures in reservoirs by techniques such as hydraulic fracturing.

Available evidence, (Winterstein, 1990) including offset VSP information supports the notion that the vertical S-wave birefringence is caused by horizontal stresses, and that the polarization direction of the fast S-wave lies in the direction of maximum horizontal compressive stress, even when subsurface structures are steeply dipping. It is likely however that rocks exist for which the polarization direction of the fast S-wave for vertical travel does not lie along the maximum horizontal stress direction. Rocks with fractures oriented by ancient stress regimes, or rocks of low symmetry with tilted symmetry axes, for example, might constrain the fast S-wave polarization to lie in a direction other than that of maximum horizontal stress.

Unmistakable evidence has been presented for major changes in S-wave polarization direction with depth (see also Martin et al., 1986). A relationship exists between these polarization changes and any change of horizontal stress direction, and the S-wave birefringence data provide potentially useful information for reservoir development. U.S. Pat. Nos. 4,803,666 and 4,817,061 (both to Alford) are hereby incorporated by reference. Alford discloses a method of determining the S-wave polarization angles by finding the angle at which S-wave energy on off-diagonal components of an S-wave data matrix was at a minimum. One implementation of Alford's method, for VSP data, involves selecting time windows that include only the leading portions of the first arrival S-waves, and then calculating energy on the off-diagonal components at rotation angle increments of one degree. Such an implementation is costly because it requires rotating the data and calculating the energy at least 89 times.

Lefeuvre et al. (1989) and Cox et al. (1989) used propagator matrices or transfer functions to analyze variations in S-wave birefringence with depth in multicomponent VSP data, instead of applicant's proposed method of shear-wave analysis.

The method of analyzing shear-wave polarization directions cited above may be sufficiently accurate, but is costly in computer time, for the reasons stated above. To be able to conduct an analysis on small computers (in the field, for example), there is a need for a fast and economic method of analyzing shear-wave polarization directions.

SUMMARY OF THE INVENTION

The present invention is surprisingly successful in improving the speed of shear-wave polarization analysis. Data on which the invention would be used, either vertical seismic profile or surface seismic reflection data has at least first and second, linearly independent, nearly orthogonal, and nearly horizontal source axes (Sx, Sy), and each source axis has at least first and second linearly independent, nearly orthogonal, and nearly horizontal corresponding receiver axes, for recording both a fast and a slow shear-wave.

A time window is selected that is broad enough to include enough of a vertical seismic profile wavelet for the fast and slow shear-waves to provide an accurate statistical representation of the energy of the wavelets. If surface seismic reflection data is used, a waveform is selected that corresponds to a chosen seismic event or geologic reflecting interface, rather than a wavelet.

The energy in the time window of two off-diagonal components Dxy and Dyx is determined, where the summation is over time samples in the time window.

$$\text{Energy }(\theta) = \sum_t [D^2xy(\theta) - D^2yx(\theta)].$$

where $\theta = 0°$ is the initial source-receiver coordinate frame such that sources and receivers are in the same Cartesian frame.

The source and receiver coordinate frame is rotated by an arbitrary angle, $\theta_1$, which is large enough to provide an easily measurable change in signal amplitude on the off-diagonal components. Energy is again determined at the new rotated angle, and the coordinate frame is then rotated a second time. A third energy determination is made of the off-diagonal components, and a simple curve of trigonometric functions is generated to fit the determined energy values, where $$\text{Energy}(\theta) = a - b\cos(4\theta) + d\sin(4\theta).$$

where a, b, and d are constants.

A minimum value for this equation is determined, and the coordinate frame (say the x-axis) is then rotated by the angle that gives the minimum value, such that the rotation maximizes the signal on the diagonal components.

DETAILED DESCRIPTION OF THE DRAWINGS

FIG. 1 is a sectional view of the earth, illustrating the basic model for VSP shear-wave recording.

FIG. 2 is a sectional view of the earth, illustrating the natural coordinate frame for vertical shear-waves.

FIG. 3 is a plan view of the earth, illustrating the coordinate frame for recording and processing shear-wave data, and the meaning of the 2×2 shear-wave matrix.

DETAILED DESCRIPTION OF THE INVENTION

In accordance with the present invention, a new improved method and means for analyzing shear-wave polarization directions has been developed.

The objective of the data analysis described herein is to rotate source and receiver axes, say the x-axes, into alignment with the natural polarization direction of the fast S-wave. Natural polarization directions are directions along which anisotropic rocks constrain polarizations of S-waves to lie. The purpose of the analysis is to correlate birefringence effects with formation properties such as direction of maximum horizontal stress. FIGS. 1 and 2 illustrate the basic model in simplest terms. An arbitrarily oriented horizontal displacement from a surface source propagates in the vertical direction as a fast S-wave ($S_1$), and a slow S-wave ($S_2$), with $S_1$ polarized along the direction of maximum horizontal compressive stress.

The term "polarization" in the context of seismic waves refers to the shape and spatial orientation of particle trajectories. The term is restricted to mean only the spatial orientation of the line along which a particle moves in a linearly polarized wave. Hence "polarization" and "polarization direction", as used here, both imply the spatial orientation of such a line, the latter term emphasizing the restriction to linear rather than more general (e.g., elliptical) motion. A "polarization change", then, does not mean a change, for example, from linear to elliptical motion nor a polarity reversal but only a change in the spatial orientation of the line along which a particle moves.

For arbitrary ray directions in anisotropic rocks of low symmetry, a great deal of information is needed to interpret S-wave time lags and polarizations. However, if the rocks have vertical twofold symmetry axes, analysis is straightforward if raypaths are vertical, and polarization directions relate in simple ways to symmetries of the rocks. An initial assumption is that the rocks have vertical symmetry axes and that their symmetry properties do not change with depth. Hence, in order to have raypaths as close to the symmetry axis as possible, for VSP recording in near-vertical wells, the near offset sources are positioned as close to the wells as possible. Concentric rings of offset VSPs serve primarily as a check on the assumption of a vertical symmetry axis. That is, modeling showed that if the vertical direction is not a symmetry axis, S-wave polarizations at small offsets can vary asymmetrically with azimuth if the rocks are of orthorhombic or lower symmetry, even if there is a set of vertical cracks. On the other hand, if there is a vertical twofold symmetry axis, such S-wave polarizations will have twofold symmetry. To determine natural polarization directions of the subsurface rock, an improved rotation method has been developed. The most reliable prior art method is to find the angle at which S-wave energy on off-diagonal components of the 2×2 S-wave data matrix is a minimum, a method we call the "rotation" method developed by Alford.

The present inventive method permits an analysis of shear-wave polarization directions relative to a fixed coordinate frame. Shear-wave data from either a vertical seismic profile or from surface seismic reflection techniques can be analyzed providing that the data has at least two linearly independent, nearly orthogonal, and nearly horizontal source axes (Sx, Sy), and each source axis has at least two linearly independent, nearly orthogonal, and nearly horizontal receiver axes (Rx, Ry), for both a fast and a slow shear-wave. Individual data ("D") components are represented by Dxx, Dxy, Dyx, and Dyy.

A time window is selected which is broad enough to include enough of the recorded first-arrival wavelets from a vertical seismic profile, so that the fast and slow shear-wave wavelets can provide an accurate statistical representation of the energy of the wavelets. Energy is defined to mean the sum of the squares of the amplitudes. Selection of an adequate time window is known to one of ordinary skill in the art of seismic data processing.

The energy in the selected time window of two off-diagonal components, Dxy and Dyx is determined from the following relationship:

$$\text{Energy }(\theta) = \sum_t [D^2xy(\theta) + D^2yx(\theta)]$$

where $\theta$ is 0° for the first calculation, at the initial source-receiver coordinate frame such that sources and receivers are in the same coordinate frame. The summation is over time samples in the selected time window. This relationship is known to one of ordinary skill in the art of seismic data processing.

The source-receiver coordinate frame is then rotated by an arbitrary angle, $\theta_1$, so that $\theta_1$ is large enough to provide a measurable change in signal amplitude on the off-diagonal components, Dxy and Dyx. By measurable, we mean large enough to avoid numerical computer errors. In practice, it is frequently useful to use an angle that is large enough to be visually detectable. As one rotation is as costly as another, it is frequently preferable to rotate by a relatively large angle.

Energy in the time window of the off-diagonal components Dxy and Dyx is then determined as before, now using $\theta_1$, so that $$\text{Energy}(\theta_1) = \sum_t [D^2xy(\theta_1) + D^2yx(\theta_1)].$$

where $\theta_1$ is the above-described arbitrary angle. Summation is again over samples in the time window.

The source and receiver coordinate frame is then rotated by a second arbitrary angle, so that $\theta_2$ is the new angle of rotation, from the initial point, $\theta = 0°$, and so that $\theta_2$ is large enough to provide a measurable change in signal amplitude on the off-diagonal components, Dxy and Dyx, from both $\theta$ and $\theta_1$.

Energy in the time window of the off-diagonal components Dxy and Dyx is determined as before, now using $\theta_2$, so that $$\text{Energy}(\theta_2) = \sum_t [D^2xy(\theta_2) - D^2yx(\theta_2)]$$

The equations for Energy in the selected time window may be expressed in the more general form of $$\text{Energy}(\theta) = \sum_t [D^2xy(\theta,t) - D^2yx(\theta,t)].$$

for each case.

The next step is to generate a curve of trigonometric functions to fit the three calculated energy values at $\theta$, $\theta_1$, and $\theta_2$, so that $$\text{Energy}(\theta) = a - b \cos(4\theta) - d \sin(4\theta). \tag{1}$$

where a, b, and d are constants. This equation is derived from the general expression for energy, which is $$\text{Energy}(\theta) = (B^2 - E^2)(C^4 + S^4) - [2(D-A)^2 - 4BE]C^2S^2 2(B-E)(D-A)]SC^3 - CS^3].$$

where $A = Dxx$, $B = Dxy$, $E = Dyx$, $D = Dyy$, $C = \cos\theta$, and $S = \sin\theta$; where Dxy implies data recorded on the y-oriented receiver from the x-oriented source, etc. This general expression simplifies to equation (1) above, via trigonometric identities.

A minimum value for equation (1) is then determined, and an axis of the coordinate frame (the x-axis for example) is rotated from $\theta = 0°$ by the angle that gives this minimum value, so that nearly all of the signal is aligned with the diagonal components of the data matrix. By this we mean that the rotation maximizes the signal on the diagonal components.

When the shear-wave polarizations are orthogonal, this rotation optimally separates the two shear-waves, and the angle of rotation gives the absolute orientation of the fast and slow shear-wave polarizations. The orientation of the fast shear-wave is determined by evaluating on which diagonal component the signal arrived earlier. If that component is along the x-axis, then the polarization direction of the fast shear-wave is at the orientation of the x-axis. Otherwise, the orientation is along the y-axis.

This novel method greatly reduces the amount of time and money necessary to rotate the coordinate frame to the correct position, as only three energy calculations are performed. Prior art methods involved rotating by arbitrary amounts, say 1 degree, and then calculating the energy at each rotation. The angle of minimum energy on off-diagonal components was then obtained by comparing all computed energy values.

Another class of prior art methods involved the use of an analytical expression such as $$\theta = \frac{1}{2} \tan^{-1}\left[\frac{Dxy + Dyx}{Dxx - Dyy}\right] \tag{2}$$

to determine the rotation angle. This equation does not work for averages over a time window but must be applied time sample by time sample. Use of individual time samples in this way is unstable unless signal amplitude is well above noise levels simultaneously on all four components. Hence use of the inventive method is more robust than methods which use an analytical expression such as the one described above.

Only the leading portions of wavelets need to be included because earlier observations showed that, after rotation to the angle which minimized off-diagonal energy, the codas of diagonal wavelets differed from one another much more than did their leading edges. Hence, the leading edges are much more interpretable than the codas. The use of time windows provides a considerable signal-to-noise ratio (S/N) advantage over methods which calculate from individual points, and lends stability and consistency to the answers. In most cases results are insensitive, within limits, to the length of the time window.

Seismic sources can be rotated by the same angle as receivers, which is appropriate for vertical rays along vertical symmetry axes in homogeneous anisotropic media. The differences in arrival times of fast and slow S-waves (the lags) can be computed by crosscorrelating waves on the $2\times 2$ S-wave matrix diagonals after rotating to the angle that minimized off-diagonal energy. Lag is observed to increase linearly with depth in a homogeneous, birefringent rock.

The rotation is generally applied to VSP data at all levels, or, when layer stripping, to all data at and below the level where the polarization changes. We denote this as a rotation from the x-y coordinate frame, which is the initial coordinate frame of the sources (simulated sources after layer stripping), into the x'-y' frame, the frame of the S-wave polarizations. The rotation lines up the x source and y receiver or y source and y receiver polarizations along the direction of the fast S-wave polarization. Ideally, after this rotation, no signal energy would remain on the X'Y' or Y'X' components, and the signal on the Y'Y' components should be time-shifted versions of the X'X' components.

A second embodiment of inventive method may be applied to the case where surface seismic reflection shear-wave data is used. Again, the data must have at least two linearly independent, nearly orthogonal, and nearly horizontal source axes (Sx, Sy) and each source axis requires at least two linearly, nearly orthogonal, and nearly horizontal receiver axes (Rx, Ry), for recording both a fast and a slow shear-wave.

For surface seismic reflection shear-wave data, a waveform that is associated with a selected seismic event is used, instead of a first-arrival wavelet. For a selected event, a time window is selected, which is broad enough to include enough of the recorded waveform so that the fast and slow shear-waves can provide an accurate statistical representation of the energy of the waveform. Energy is again defined as the sum of the squares of the amplitudes.

The energy in the selected time window of two off-diagonal components, Dxy and Dyx is then determined, using the same relationship as with vertical seismic profile data, that is $$\text{Energy} = \sum_t [D^2xy(\theta) - D^2yx(\theta)]$$

where $\theta$ is 0° for this initial calculation. The summation is again over time samples in the time window. The source-receiver coordinate frame is then rotated by an arbitrary angle $\theta_1$, as with the vertical seismic profile data. $\theta_1$ again must be of sufficient magnitude to provide a measurable change in signal amplitude on the off-diagonal components, Dxy and Dyx.

The procedure for surface seismic reflection shear-wave data is now the same as that for vertical seismic profile data. A minimum energy value for the trigonometric function is determined, and the coordinate frame is rotated from $\theta=0°$ by the angle that gives this minimum value, so that nearly all of the signal is put on the diagonal components of the data matrix.

In another embodiment, using seismic reflection data, more than one time window is selected, on different seismic event waveforms. The time windows are broad enough to include enough of the selected waveforms, so that the shear-waves provide an accurate statistical representation of the energy of the waveforms.

In a further embodiment of the invention, the procedure for seismic reflection data further comprises the step of averaging (or smoothing) the calculated angles over several depth points, to reduce noise-related fluctuations, prior to the step of rotating the coordinate frame by the angle that gives the minimum value of off-diagonal energy.

The subject method has the important advantage of greatly reducing the amount of time and money needed to rotate the coordinate frame to the correct position, as only three energy calculations are performed. The prior art methods were analogous to those cited above for VSPs. With reflection seismic data, the deficiencies of the prior art methods are more pronounced than for VSPs. Rotating and calculating energy at small angle increments is time consuming because the volume of data is much larger than for VSPs, especially if the process is done prior to stacking. Because of the higher noise levels in reflection data than in first-arrival VSP data, the methods involving point-by-point calculations via an analytical expression like equation (2) are highly unstable. Prior methods as well as the present method would incorporate a smoothing step to reduce or eliminate fluctuations from noise in the data.

While a preferred embodiment of the invention has been described and illustrated, it should be apparent that many modifications can be made thereto without departing from the spirit or scope of the invention. Accordingly, the invention is not limited by the foregoing description, but is only limited by the scope of the claims appended hereto.

What is claimed is:

1. A method of geophysical exploration by analyzing shear-wave polarization directions, relative to a fixed coordinate frame, of vertical seismic profile data, said data having at least first and second linearly independent, nearly orthogonal, and nearly horizontal source axes (Sx, Sy), and each of said source axes having at least first and second linearly independent, nearly orthogonal, and nearly horizontal corresponding receiver axes (Rx, Ry), for both a fast and a slow shear-wave, comprising the steps of:

(a) selecting a time window which is broad enough to include enough of a first arrival wavelet for said fast shear-wave and said slow shear-wave to provide an accurate statistical representation of the energy of said wavelets;

(b) determining the energy in said time window of two off-diagonal components, Dxy and Dyx, where $$\text{Energy} = \sum_t [D^2xy(\theta) + D^2yx(\theta)].$$

where $\theta=0°$;

(c) rotating said source-receiver coordinate frame by an arbitrary angle, $\theta_1$, said angle large enough to provide a measurable change in signal amplitude on said off-diagonal components;

(d) determining the energy in said time window of said off-diagonal components, as in step (b), using $\theta_1$;

(e) rotating said coordinate frame by a second arbitrary angle, so that $\theta_2$ is the new angle of rotation;

(f) determining the energy in said time window of said off-diagonal components, as in step (b), using $\theta_2$;

(g) generating a trigonometric equation to fit said calculated energy, from $\theta$, $\theta_1$, and $\theta_2$, where $$\text{Energy}(\theta) = a + b \cos(4\theta) + d \sin(4\theta).$$

where a, b, and d are constants;

(h) determining a minimum energy value for said trigonometric equation; and (i) rotating said coordinate frame by the angle that gives said minimum value, so that nearly all of said signal is put on said diagonal components.

2. A method of geophysical exploration by analyzing shear-wave polarization directions, relative to a fixed coordinate frame, of surface seismic reflection data, said data having at least first and second linearly independent, nearly orthogonal, and nearly horizontal source axes (Sx, Sy), and each of said source axes having at least first and second linearly independent, nearly orthogonal, and nearly horizontal corresponding receiver axes (Rx, Ry), for both a fast and a slow shear-wave, comprising the steps of:

(a) selecting a time window which is broad enough to include enough of a selected waveform for said fast shear-wave and said slow shear-wave to provide an accurate statistical representation of the energy of said waveform;

(b) determining the energy in said time window of two off-diagonal components, Dxy and Dyx, where $$\text{Energy} = \sum_t [D^2_{xy}(\theta) + D^2_{yx}(\theta)],$$

where $\theta = 0°$;

(c) rotating said source-receiver coordinate frame by an arbitrary angle, $\theta_1$, said angle large enough to provide a measurable change in signal amplitude on said off-diagonal components;

(d) determining the energy in said time window of said off-diagonal components, as in step (b), using $\theta_1$;

(e) rotating said coordinate frame by a second arbitrary angle, so that $\theta_2$ is the new angle of rotation;

(f) determining the energy in said time window of said off-diagonal components, as in step (b), using $\theta_2$;

(g) generating a trigonometric equation to fit said calculated energy, from $\theta$, $\theta_1$, and $\theta_2$, where $$\text{Energy}(\theta) = a + b \cos(4\theta) + d \sin(4\theta),$$

where a, b, and d are constants;

(h) determining a minimum energy value for said trigonometric equation; and (i) rotating said coordinate frame by the angle that gives said minimum value, so that nearly all of said signal is put on said diagonal components.

3. The method described in claim 2, wherein more than one time window is selected, on different seismic event waveforms, where said time windows are broad enough to include enough of said selected waveforms for said shear-waves to provide said accurate statistical representation of said energy of said waveforms.

4. The method described in claim 2 or 3, further comprising the additional step of averaging said calculated angles over several depth points to reduce noise-related fluctuations, prior to the step of rotating said coordinate frame by the angle that gives said minimum value.

* * * * *